March 4, 1941.  D. A. DENT  2,233,996
PORTION DISPENSING BOTTLE
Filed Jan. 3, 1939  2 Sheets-Sheet 2
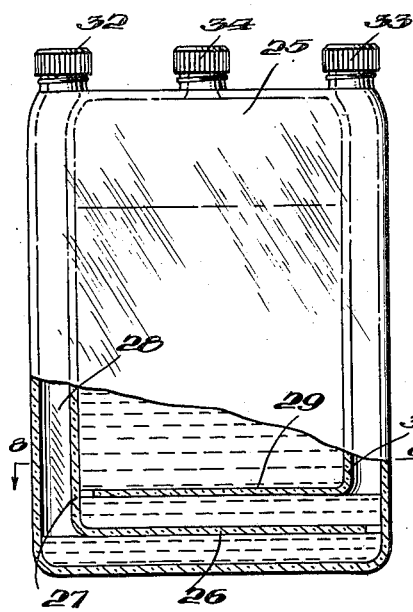
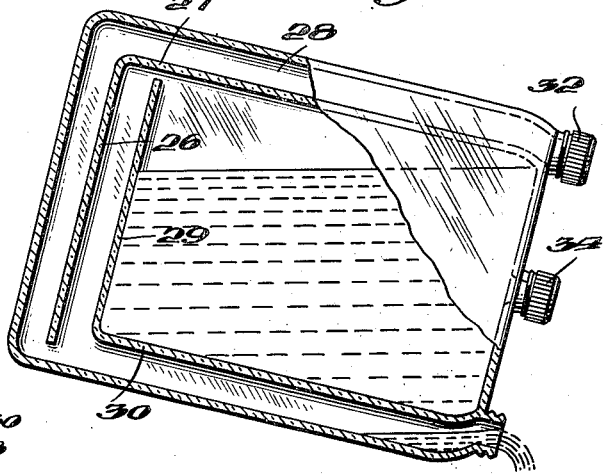
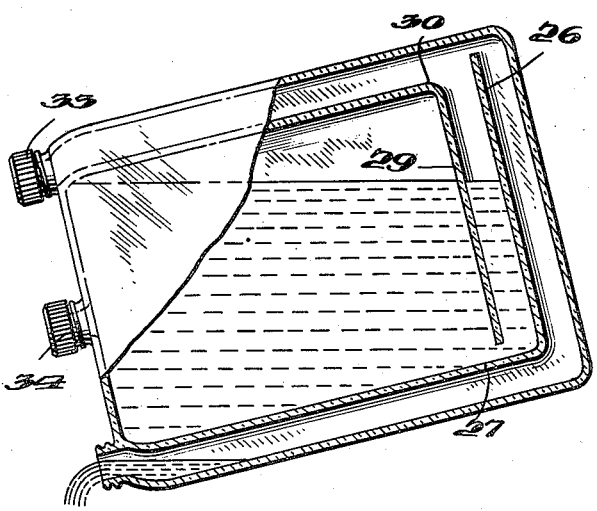
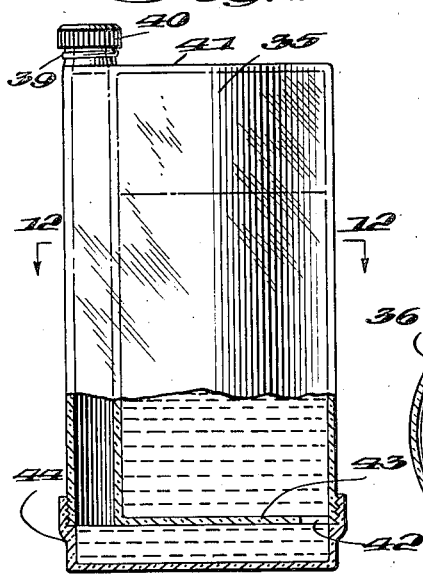
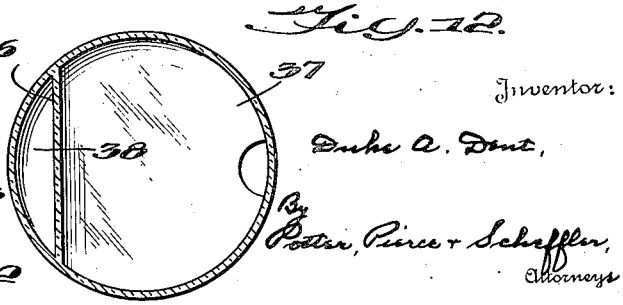

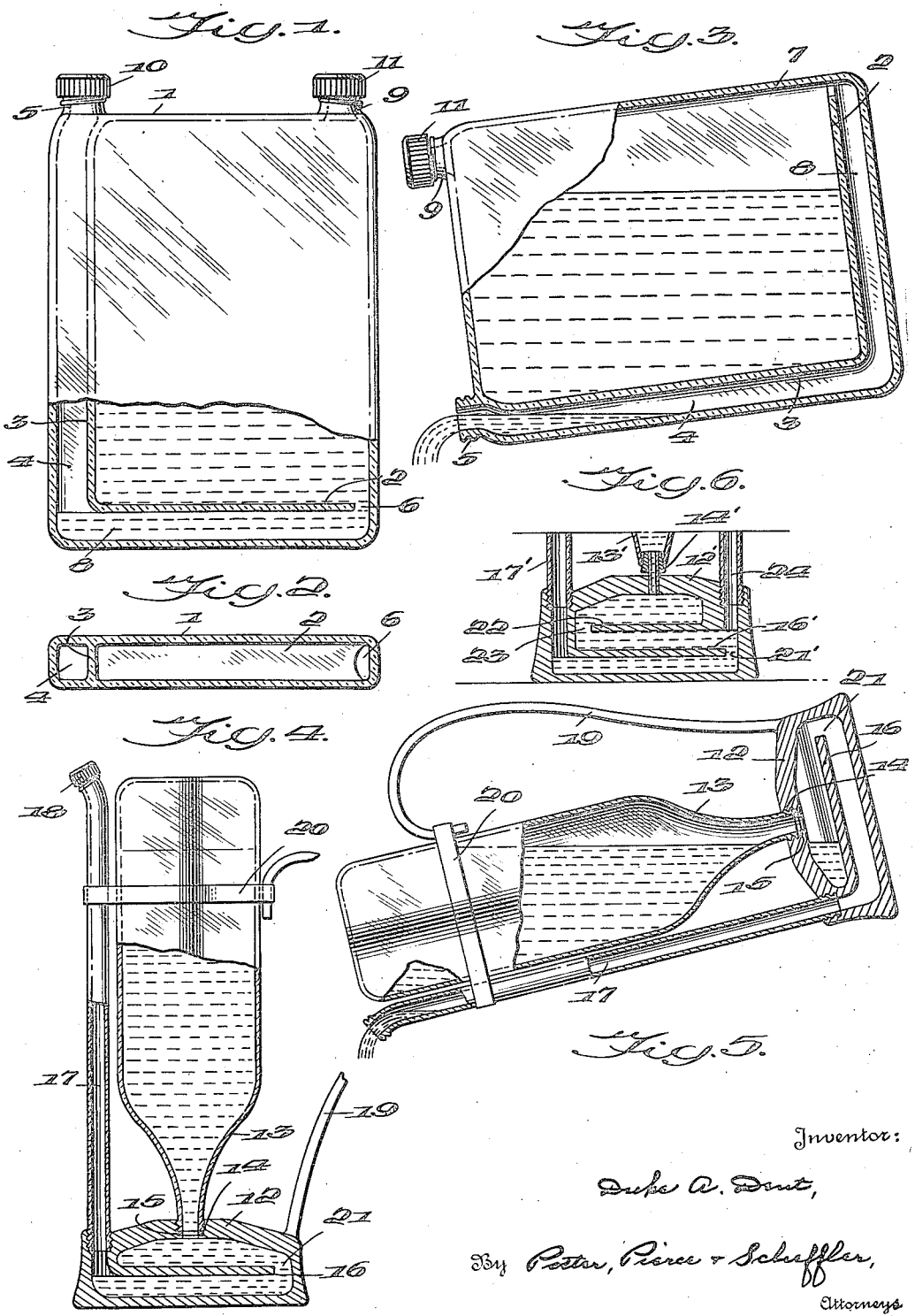

Patented Mar. 4, 1941

2,233,996

UNITED STATES PATENT OFFICE 2,233,996

PORTION DISPENSING BOTTLE

Duke A. Dent, Charleston, W. Va.

Application January 3, 1939, Serial No. 249,077

4 Claims. (Cl. 221—98)

This invention relates to portion dispensing bottles, jars and the like that include measuring compartments for determining the portion or quantity of liquid that will be dispensed from the bottle or jar at any one pouring operation.

This application is a continuation-in-part of my prior application, Serial No. 60,541, filed Jan. 23, 1936, "Portion pouring container."

Objects of the invention are to provide simple bottle and jar containers that may be handled in the usual manner to dispense the same measured portion whether the container is full or partly full. Another object is to provide dispensing bottles having a tightly closed main compartment above a measuring compartment, and a pouring passage of relatively large size extending from the measuring compartment to an outlet. A further object is to provide a dispensing bottle having superposed measuring compartments at the bottom of the bottle, and pouring passages extending along opposite sides of the bottle to outlets at the top, the inlet opening of each measuring compartment being arranged opposite the pouring passage for that measuring compartment and the arrangement being such that the liquid will be dispensed from one or from both measuring compartments depending upon the particular pouring passage that is used. Another object is to provide dispensing containers having a measuring compartment located between a main compartment and a pouring passage, the main compartment being a bottle and the measuring compartment and pouring passage constituting a separate unit on which the bottle is removably supported.

These and other objects and advantages of the invention will be apparent from the following specification when taken with the accompanying drawings in which:

Fig. 1 is a side elevation, partly in section, of a dispensing bottle constituting one embodiment of the invention;

Fig. 2 is a transverse section through the same;

Fig. 3 is a side elevation, with parts in section, of the bottle in pouring position;

Fig. 4 is a fragmentary side elevation, with parts in section, of a portion dispensing decanter that includes a measuring base to which a bottle is fitted;

Fig. 5 is a side elevation, partly in section, of the decanter in pouring position;

Fig. 6 is a fragmentary transverse section through a decanter base that has two measuring compartments;

Fig. 7 is a side elevation, partly in section, of a dispensing bottle having two measuring compartments;

Fig. 8 is a transverse section on line 8—8 of Fig. 7;

Figs. 9 and 10 are side elevations, with parts in section, of the Fig. 7 bottle in pouring positions for dispensing a double or a single portion, respectively;

Fig. 11 is a side elevation, with parts in section, of another embodiment of the invention; and Fig. 12 is a transverse section on line 12—12 of Fig. 11.

In the drawings, the reference numeral 1 identifies a bottle or jar of any desired shape and material. As illustrated, the bottle 1 is a relatively flat glass flask of approximately rectangular shape. An imperforate partition 2 extends transversely across the interior of the bottle above the bottom wall thereof and terminates short of the opposite edge walls of the flask. A vertically disposed partition wall 3 extends upwardly from one end of the transverse partition 2 and, with the adjacent bottle walls, forms a pouring passage 4 of relatively large size that terminates in a pouring outlet 5 at an upper corner of the flat bottle. The spacing of the other end of the partition 2 from the adjacent edge wall of the bottle leaves an opening 6 between the main compartment 7 above the partition 2 and the measuring compartment 8 below the partition.

A filling opening 9 for the main compartment is preferably arranged at the upper corner opposite the pouring outlet 5, and appropriate closures are provided for these openings. As illustrated, the closures may be caps 10, 11 that are threaded upon the necks of the openings 5, 9, respectively. The filling cap 11 must provide a tight seal for the main compartment and the threads of the cap 11 and neck opening 9 are preferably left-hand to insure against the removal of cap 11 when liquid is to be poured from the bottle.

The method of operation will be apparent from an inspection of Figs. 1 and 3. Only the measured portion lying below the partition 2 will be dispensed when the cap 10 is removed and the bottle is turned counterclockwise from the Fig. 1 position to that shown in Fig. 3. When the bottle is turned back to normal position, air and liquid pass through the opening 6 in opposite directions until the liquid at the bottom of the bottle rises to the lower surface of the partition 2. The liquid will not enter the pouring passage 4 since the filling cap 11 has an airtight fit on the bottle and air cannot travel from the pouring passage 4 to the main compartment 7 when the measuring chamber 8 is full.

As shown in Figs. 4 to 6, the dispensing container may take the form of a hollow measuring base 12 that is fitted upon a bottle 13 to form a dispensing decanter. The upper wall of the base 12 has a centrally located threaded opening 14 for fitting over the threaded neck of the bottle, a washer 15 being arranged at the base of the opening to form a tight joint when the parts are in the normal illustrated position. The base 12 has a transverse partition 16 that terminates short of the diametrically opposite walls of the base and a pouring spout 17 is threaded into the base at one end of the partition. The pouring spout may be provided with a cap 18 or other closure, and a handle 19 extends upwardly from the base 12 to a guard ring or strap 20 that extends around the bottle 13 and the pouring spout 17. The handle 19 is directly above the opening 21, at the end of the partition 16, by which the measuring space below the partition communicates with the inlet space above the same.

As shown in Fig. 6, the hollow base 12' is provided with an inlet stem and soft bushing 14' that fits within the neck of a bottle 13'. A measuring compartment is formed at the lower portion of the base 12' by a partition 16', and the pouring passage 17' communicates with this measuring chamber opposite the inlet opening 21'. These parts are substantially the same as the corresponding elements shown in Figs. 4 and 5. A second measuring compartment is formed above the partition 16' by the transverse wall 22 that is spaced from one edge of the base 12 to leave an inlet opening 23 adjacent the pouring passage 17' of the lower measuring chamber. A pouring spout 24 is threaded into the base 12' to open into the upper measuring compartment directly above the opening 21' of the lower compartment.

Inspection of Fig. 6 will show that the single measured portion lying below the partition 16' will be dispensed if the decanter is tilted to the left to pour through the outlet passage 17', and that this measured charge and also the measured portion lying between partitions 16' and 22 will be dispensed when the decanter is tilted to the right to discharge through the passage 24.

A flask type of single or double portion dispenser is illustrated in Figs. 7 to 10, inclusive. The bottle 25 has a lower transverse partition 26 that terminates short of the opposite walls of the bottle, and a vertical partition 27 extends upwardly from the left end of the partition 26 to form a pouring passage 28. A second transverse partition 29 extends across the bottle above the partition 26 and terminates short of the partition wall 27 to leave an inlet opening into the measuring compartments. A vertical partition 30 extends upwardly from the right end of the partition 29 to form a second outlet passage 31. Removable closures 32, 33 are provided for the pouring passages 28 and 31, respectively, and the filling opening of the bottle has a cap 34 which provides a tight closure for the bottle.

As shown in Figs. 9 and 10, the measured portions in the two compartments below the partition 29 will be dispensed when the cap 33 is removed and the bottle is tipped to the right, but only the single portion lying below the partition 26 will be dispensed when the cap 32 is removed and the bottle is tipped to the left.

The dispensing container shown in Figs. 11 and 12 takes the form of a cylindrical casing 35 having a longitudinal partition wall 36 which divides the container into a main compartment 37 and a pouring passage 38. The upper end of the pouring passage terminates in a threaded outlet 39 that is normally closed by a cap 40. The upper end of the main compartment 37 is permanently closed by the end wall 41, and the filling opening 42 for the container is formed by a notch in the opposite end wall 43 of the container, it being understood that the container is inverted from the position shown in Fig. 11 when it is to be filled. The measuring compartment beneath the wall 43 is formed by the end cap 44 that is threaded upon the container 35. The method of operation of this form of the invention will be apparent from the descriptions of the other embodiments.

It is to be understood that the embodiments herein shown and described are typical of the invention and that various changes may be made in the design of the bottle or container, and in the relative sizes and shapes of the parts without departing from the spirit of the invention as set forth in the following claims.

I claim:

1. In apparatus for dispensing substantially equal quantities of liquid at each pouring from the apparatus, a hollow base having side walls extending between top and bottom walls, an inlet opening in the top wall, means for hermetically sealing the open end of a bottle to said inlet opening, an imperforate transverse partition spaced from said bottom wall and terminating at its opposite edges short of the opposite walls of said base, and a pouring spout communicating at one edge of the partition with the space below the same, the spacing of the other edge of the partition from the wall of the base providing a continuously open passage between the measuring space below the partition and the space above the same.

2. A portion dispensing decanter comprising a hollow measuring base having an inlet opening in its top wall, a bottle and means securing the same to said base with the open end of the bottle sealed to the inlet opening, a pouring spout extending upwardly from said base, an imperforate transverse partition within said measuring base, and having opposite edges terminating short of the opposite walls of the base to leave openings through which the measuring space below said partition opens into said pouring spout and into the space above said partition.

3. A portion dispensing decanter comprising a hollow measuring base having an inlet opening in its top wall, a bottle and means securing the same to said base with the open end of the bottle sealed to the inlet opening, means defining pouring channels extending upwardly from said base along opposite sides of the bottle, a pair of vertically spaced transverse partitions dividing the space within said base into an upper inlet compartment and two superposed measuring chambers, the upper partition extending from one pouring channel towards and terminating short of the wall of the second pouring channel, and the lower partition extending from the second pouring channel toward and terminating short of the opposite wall of the base.

4. A receptacle for dispensing measured quantities of liquid at each pouring from the receptacle, said receptacle comprising a hollow body having side walls extending between top and bottom walls, a pair of transverse partitions spaced from the bottom wall and from each other to define two superposed measuring chambers at the bottom of the receptacle, walls defining a pouring channel extending upwardly from each measuring chamber, said channels being at opposite sides of the receptacle and said partitions extending from the inlet ends of the pouring channels towards but terminating short of the opposite wall to leave for each measuring chamber an opening opposite the inlet of the pouring channel which leads from that measuring chamber, and means forming a hermetic closure for that portion of the receptacle which lies above the upper partition.

DUKE A. DENT.